United States Patent [19]

Fujii et al.

[11] 4,342,905
[45] Aug. 3, 1982

[54] AUTOMATIC FOCUSING DEVICE OF A MICROSCOPE

[75] Inventors: Norio Fujii, Urawa; Atsushi Kawahara, Tokyo; Masahiro Sawada, Kawasaki, all of Japan

[73] Assignee: Nippon Kogaku K.K., Tokyo, Japan

[21] Appl. No.: 180,150

[22] Filed: Aug. 21, 1980

[30] Foreign Application Priority Data

Aug. 31, 1979 [JP] Japan ................. 54/110363
Oct. 27, 1979 [JP] Japan ................. 54/138271
Aug. 16, 1980 [JP] Japan ................. 55/112305

[51] Int. Cl.³ .............................. G01J 1/20
[52] U.S. Cl. ................................. 250/201
[58] Field of Search ........... 250/201, 204, 209, 578; 354/25; 356/4, 5

[56] References Cited

U.S. PATENT DOCUMENTS 3,970,841 7/1976 Green ..................... 250/578
4,254,330 3/1981 Stauffer et al. ........... 250/204
4,297,571 10/1981 Utagawa et al. .......... 250/201

Primary Examiner—David C. Nelms
Attorney, Agent, or Firm—Shapiro and Shapiro

[57] ABSTRACT

An automatic focusing device of a microscope having an objective lens and a stage on which a specimen is placed comprises distance varying means for varying the relative distance between the objective lens and the stage, distance detecting means for producing a distance output corresponding to said distance, photoelectric detector means for photoelectrically detecting a high frequency component of the space frequency component of the image of the specimen on the stage by the objective lens, judging means for judging whether or not a predetermined peak smaller than a maximum peak exists in the output of the photoelectric detector means within a predetermined distance range from a first distance output of the distance detecting means when the output of the photoelectric detector means assumes said maximum peak and for producing an in-focus output when said predetermined peak exists, and means for determining said relative distance on the basis of said in-focus output.

6 Claims, 17 Drawing Figures

AUTOMATIC FOCUSING DEVICE OF A MICROSCOPE

BACKGROUND OF THE INVENTION

1. Field of the Invention

This invention relates to a focus detecting device of a microscope, and more particularly to an automatic focusing device of a phase-contrast microscope.

2. Description of the Prior Art

Generally, an automatic focusing device for an optical instrument such as a microscope or the like photoelectrically converts the image of an object by an objective lens into an image signal, extracts the high frequency component of this image signal to extract the high frequency component of the space frequency component of the image, and adjusts the relative distance between the object and the objective lens so that this high frequency component becomes maximum. Such an automatic focusing device is simple, but it has been found that simple detection of the maximum of the high frequency component of the image signal may sometimes lead to wrong focus detection. For example, in the automatic focusing device used when a specimen for testing HLA (human leukocyte antigen), particularly for carrying out microdeoplet lymphocyte cytotoxicity lest is observed through a phase-contrast microscope, the value of the high frequency component of the image signal when the relative distance between the object, i.e. said specimen, and the objective lens of the microscope has been varied has been found to be as follows:

(1) As shown in FIG. 1 of the accompanying drawings, a maximum peak $P_1$ of the high frequency component lies at a point $l_1$ slightly spaced apart from the in-focus position BF by a predetermind distance lc, and at points $l_2$, $l_3$ at the opposite sides of this maximum peak $P_1$ spaced apart therefrom by a substantially predetermined equidistance, second and third peaks $P_2$ and $P_3$ considerably smaller than the maximum peak value $P_1$ but substantially equal in value to each other appear. Here it is to be understood that $P_2 > P_3$.

(2) In a phase-contrast objective lens, it is sometimes the case that depending on the state of the cells of the specimen, particularly the positional relation between the cells, or the presence of flaws of the container containing the specimen therein, as shown in FIG. 2 of the accompanying drawings, a great peak $P_0$ comparable to the maximum peak $P_1$ attributable to the in-focus position BF occurs at a position $l_0$ greatly spaced from the in-focus position BF.

(3) Where bubbles or dust exists in the sample, a number of peaks substantially equal in height appear as shown in FIG. 3 of the accompanying drawings.

The above experimental facts show that for the image of the phase-contrast optical system, simply regarding the position providing the maximum value of the high frequency component as the in-focus position may lead to the danger of regarding an out-of-focus position as the in-focus position.

SUMMARY OF THE INVENTION

It is the object of the present invention to provide a focus detecting device of a microscope which does not erroneously detect the above-described peak at the greatly out-of-focus point as the in-focus information but can effect proper focus detection.

The invention will become fully apparent from the following detailed description thereof taken in conjunction with the accompanying drawings.

DESCRIPTION OF THE PREFERRED EMBODIMENTS

Description will hereinafter be made of an embodiment in which the present invention is applied to an automatic focusing device used when HLA testing specimen is observed through a phase-contrast microscope.

Figure 4:
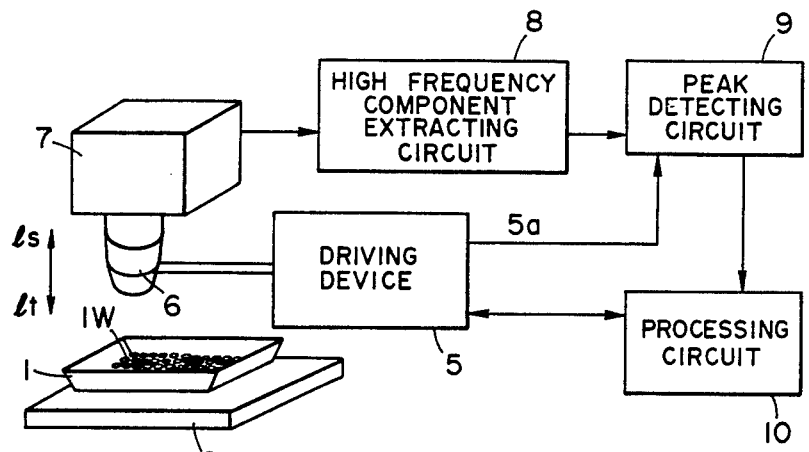
FIG. 4 is a block diagram showing the construction of the automatic focusing device according to an embodiment of the present invention.
Figure 5:
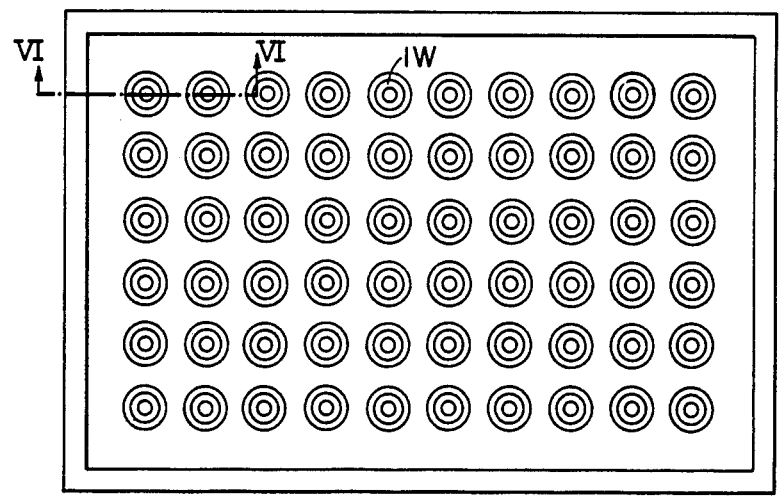
FIG. 5 is a front view of a microtest plate.
Figure 6:
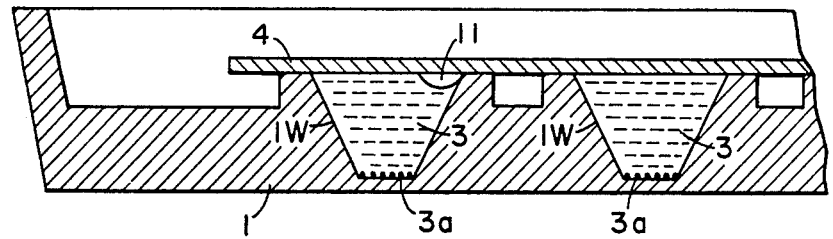
FIG. 6 is a cross-sectional view taken along line VI—VI of FIG. 5.

Referring to FIG. 4, a microtest plate or Terasaki plate 1 into which HLA testing specimen has been poured is placed on the stage 2 of a phase-contrast microscope. This microtest plate 1 is a tray of plastics having sixty wells 1W each having a volume of about 10 μl, as shown in FIG. 5, and each well 1W is conically shaped as shown in FIG. 6 and is filled with liquidous HLA testing specimen 3. An object to be observed through the microscope, namely, lymphocyte 3a, are deposited on the bottom of each well. Each well 1W is covered with a cover glass 4.

Figure 1:
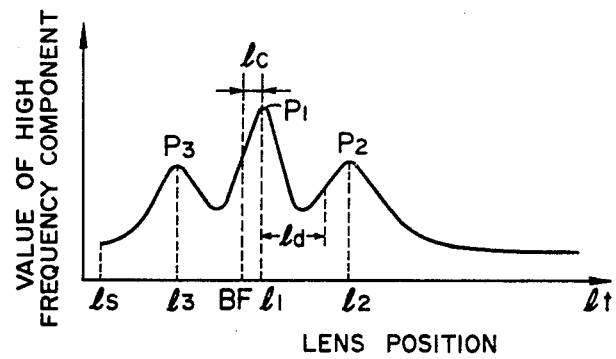
FIG. 1 is a graph showing the relation of a high frequency component to the lens position.
Figure 7:
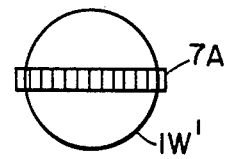
FIG. 7 shows the relation between the image of a well and a one-dimensional image pick-up element array.

Turning back to FIG. 4, a driving device 5 having a stepping motor intermittently moves the phase-contrast objective lens 6 of the microscope from a starting point ls to a terminal point lt in the direction of the optical axis. Instead of the objective lens 6, the stage 2 may be moved in the direction of the optical axis. A camera 7 having a one-dimensional solid image pick-up element array spatially scans the image of the specimen 3 by the objective lens 6 and converts it into an electrical signal. This one-dimensional solid image pick-up element array 7A has a length substantially equal to the diameter of the image 1W' of the well 1W, as shown in FIG. 7. A high frequency component extracting circuit 8 extracts the high frequency component of the space frequency component of the image from the electrical signal of the camera 7. When the objective lens 6 is driven from the starting point ls to the terminal point lt, the high frequency component, namely, the output of the high frequency component extracting circuit 8, assumes, for example, the waveform as shown in FIG. 1. In this waveform, when the objective lens 6 is at the in-focus position BF of FIG. 1, the objective lens is focused to the object 3a of FIG. 6 and when the objective lens is moved by a predetermined amount lc from the in-focus position BF to the position $l_1$, a maximum peak $P_1$ appears.

A peak detecting circuit 9 detects the value $P_1$ of the maximum peak shown in FIG. 1 from the output of the high frequency component extracting circuit 8 and an objective lens position $l_1$ providing the maximum peak $P_1$ from the position output 5a from the driving device 5 representing the position of the objective lens 6, and at the same time detects the value $P_2$ of a second peak and an objective lens position $l_2$ providing the second peak $P_2$.

However, a peak which will satisfy $$ld < |l_1 - l_2| \qquad \qquad ①$$

is selected as the second peak ($P_2$, $l_2$). The predetermined value ld is determined to a value slightly greater than the distance from the maximum peak position $l_1$ to its adjacent valley as shown in FIG. 1. The reason why the above-mentioned condition ① has been given is as follows: Noise of higher frequency than the waveform shown in FIG. 1 is superposed upon the output of the high frequency component extracting circuit 8 and therefore, in the neighborhood of the peak $P_1$, there is a number of high frequency peaks caused by said noise and thus, condition ① is for detecting, as the second peak, not such high frequency peaks but the proper second peak $P_2$ as shown.

A processing circuit 10 detects whether or not the signals $l_1 l_2$ and $P_1 P_2$ from the peak detecting circuit 9 satisfy $$|l_1 l_2| < ld' \qquad \qquad ②,$$

$$|P_1 - P_2|/\max(P_1,P_2) > \Delta P \qquad \qquad ③,$$
$$P_1 > Pth \text{ and } P_2 > Pth \qquad \qquad ④.$$

Figure 2:
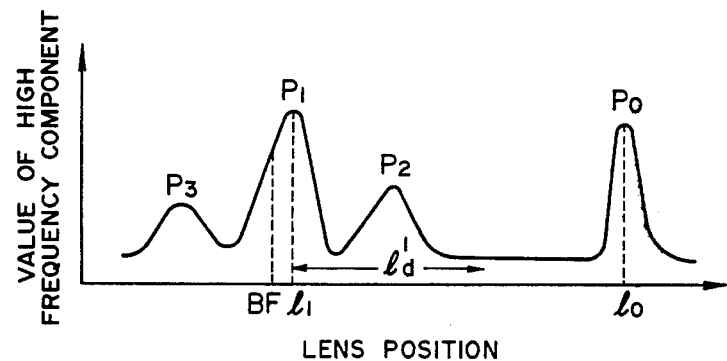
FIG. 2 is a graph showing the relation between the high frequency component and the lens position in a case where a false peak occurs at a position greatly spaced apart from the in-focus position.

The reason of condition ② is as follows: As shown in FIG. 2, where there are flaws in the bottom surface of the microtest plate 1 or dust is suspended in the sample 3, it is necessary that a false peak $P_0$ irrelative to the in-focus which appears as the result of such flaws or dust be not detected as the maximum peak $P_1$ resulting from the in-focus. The second peak $P_2$ does not lie within a predetermined range l'd in the neighborhood of the false peak $P_0$ and therefore, when the second peak position $l_2$ does not lie within the range l'd from the maximum peak position $l_1$, the then peak is regarded as the false maximum peak. The predetermined distance l'd is the distance from the maximum peak position $l_1$ to the neighborhood of the valley of the proper second peak $P_2$ in FIG. 2.

Thus, it is guaranteed that the maximum peak ($P_1 l_1$) which satisfies both conditions ① and ② is the signal resulting from a proper in-focus position and not the false peak $P_0$ in the case of great out-of-focus resulting from said flaws or the like.

Figure 3:
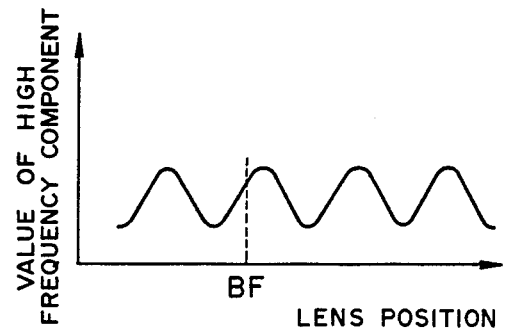
FIG. 3 is a graph showing the relation between the high frequency component and the lens position in a case where bubbles or the like are mixed with the sample.

Condition ③ is for judging whether or not the focus detection is impossible because of bubbles 11 or the like being mixed into the well 1W as shown in FIG. 6 or because of the cover glass 4 being not in intimate contact with the well 1W. When the bubbles 11 are mixed into the well as previously mentioned, the output of the high frequency component extracting circuit 8 assumes the waveform as shown in FIG. 3 and there is little difference between a number of peak values and therefore, when the difference between the maximum peak value $P_1$ and the second peak value $P_2$ is less than a predetermined value, it is judged as the mixing of bubbles or the like.

Condition ④ guarantees that the focus detecting area of the sample image is suited for the focus detection when the maximum peak $P_1$ and the second peak $P_2$ have exceeded a predetermined value Pth. If the maximum peek doesn't exceed the predetermined value Pth, very few lymphocytes exist in said detecting area so that the area is in appropriate for the focus detection.

The constants ld, l'd, $\Delta P$ and Pth of these conditions are values which are experimentally determined.

Of the above-mentioned four conditions, conditions ① and ② are requisite but conditions ③ and ④ are not requisite because mixing of bubbles and absence of lymphocytes happens very rarely.

Thus, when the maximum peak ($P_1 l_1$) and the second peak ($P_2 l_2$) satisfy all of the above-mentioned four conditions, the processing circuit 10 puts out a focusing distance signal ($l_1 - l_c$) to the driving device 5.

By this, the driving device 5 moves the objective lens 6 to the in-focus position BF.

On the other hand, when the output signals $P_1, l_1, P_2, l_2$ of the peak detecting circuit 9 do not satisfy any one of conditions ②-④ or when there is no second peak which satisfies condition ① and therefore the second peak signal $P_2, l_2$ is not applied to the processing circuit 10 as the output signal of the peak detecting circuit 9, the processing circuit 10 does not generate the in-focus output to the driving device 5 but generates a signal for horizontally moving the stage 2 to focus-detect another area. This movement of the stage 2 is effected in a direction perpendicular to the direction of arrangement of the one-dimensional image pick-up elements. As described above, the peak detecting circuit 9 and the processing circuit 10 together constitute judging means.

A specific example of the construction of the high frequency component extracting circuit 8 particulary will now be described in detail.

Figure 8:
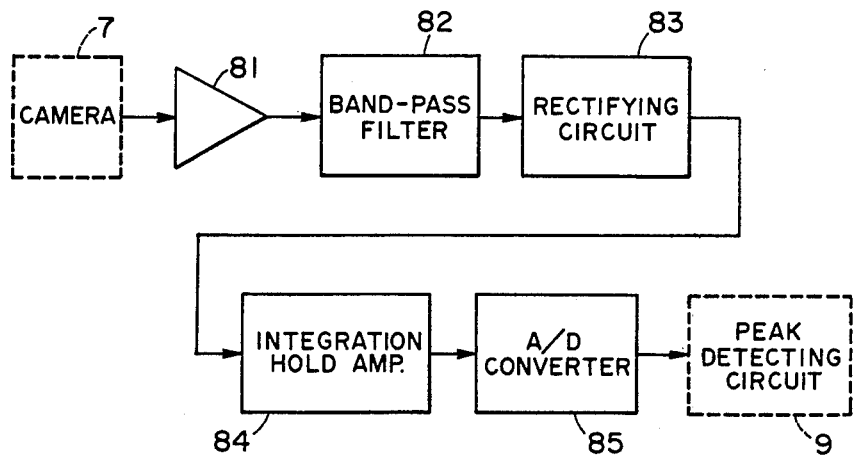
FIG. 8 is a block diagram showing the details of the high frequency component extracting circuit of FIG. 4.

Referring to FIG. 8, the high frequency component extracting circuit 8 comprises a buffer 81 for receiving the image electrical signal obtained from the camera 7, a bandpass filter 82 for extracting from the output of the buffer 81 only the signal of frequency band slightly lower than ½ of the sampling frequency of the camera 7, a rectifying circuit 83 for full-wave-rectifying the output of the filter 82, an integration hold amplifier 84 for integrating and holding the output of the circuit 83 for a predetermined time during which the objective lens 6 remains stationary during the intermittent movement of the objective lens by the driving device 5, and an A/D converter 85 for digitalizing the output of the amplifier 84 when in held condition and putting out the digitalized output of the peak detecting circuit 9. By this circuit 8, when the position of the objective lens 6 has been intermittently moved by the stepping motor of the driving device 5, the digitalized value of the high frequency component of the image signal at each position of the objective lens is put out to the peak detecting circuit 9. Thus, in the present embodiment, the output of the high frequency component extracting circuit 8 is a digital value, but in FIGS. 1-3 and 10, it is shown as an analog amount for simplicity of illustration.

Figure 9:
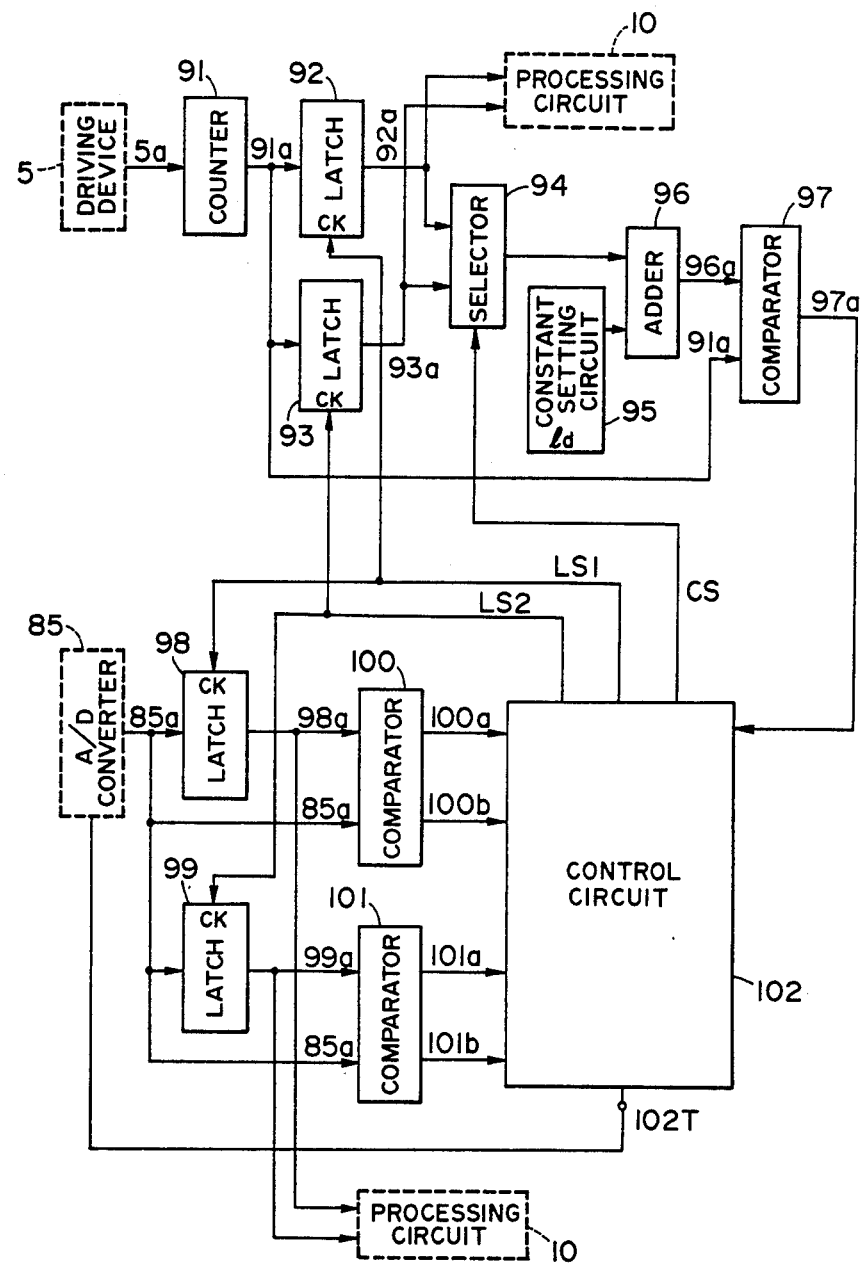
FIG. 9 is a block diagram showing the details of a peak detecting circuit.

FIG. 9 shows a specific example of the construction of the peak detecting circuit 9.

A counter 91 counts the driving pulses of the stepping motor of the driving device 5 from the start position ls of the objective lens 6, namely, the position output 5a. The contents of the counter 91 represents the position l of the objective lens 6.

Latch circuits 92 and 93 store the output 91a of the counter 91 in accordance with the latch signals LS1 and LS2 of a control circuit 102 which will later be described.

A selector 94 selects one of the output 92a of the latch 92 and the output 93a of the latch 93 by the selector change-over signal CS from the control circuit 102 and supplies it to an adder circuit 96.

A constant setting circuit 95 applies a value corresponding to said predetermined amount ld to the adder circuit 96.

In the adder circuit 96, the output of the selector 94 and the output ld of the constant setting circuit 95 are added together.

A comparator circuit 97 compares the output 96a of the adder circuit 96 with the output 91a of the counter 91 and produces an output 97a corresponding to the magnitude thereof.

Latch circuits 98 and 99 store the digital output 85a of the A/D converter 85 of the high frequency component extracting circuit 8 in accordance with the latch signals LS1 and LS2 of the control circuit 102.

A comparator circuit 100 compares the output 98a of the latch 98 with the output 85a of the A/D converter 85 and produces an output 100a when $98a > 85a$ and an output 100b when $98a < 85a$.

A comparator circuit 101 compares the output 99a of the latch 99 with the output 85a of the high frequency component extracting circuit 8 and generates an output 101a when $99a > 85a$ and an output 101b when $99a < 85a$.

The control circuit 102 controls the latch circuits 92, 93, 98 and 99 on the basis of the outputs of the comparator circuits 97, 100 and 101.

The control circuit 102 controls the circuit of FIG. 9 in each of the following control modes.

(a) First Mode

This mode takes place when the selector 94 selects the latch 92, and the control circuit 102 supplies the first latch signal LS1 to the latches 92 and 98 and causes the outputs 91a and 85a to be stored in the latches 92 and 98, respectively, when $96a > 91a$ and $85a > 98a$.

(b) Second Mode

This mode takes place when the selector 94 selects the latch 93, and the control circuit 102 supplies the second latch signal LS2 to the latches 93 and 99 and causes the outputs 91a and 85a to be stored in the latches 93 and 99, respectively, when $96a > 91a$ and $85a > 99a$.

(c) Third Mode

When $96a \leq 91a$ and $98a > 85a > 99a$ or $85a > 98a > 99a$, the control circuit 102 produces the second latch signal LS2, and then supplies a selector change-over signal CS to the selector 94 and causes the selector 94 to select the latch 93.

(d) Fourth Mode

When $96a \leq 91a$ and $99a > 85a > 98a$ or $85a > 99a > 98a$, the control circuit 102 produces the first latch signal LS1 and thereafter, supplies the selector change-over signal CS to the selector 94 and causes the selector 94 to select the latch 92.

(e) Fifth Mode

When $96a \leq 91a$ and $98a > 85a$ and $99a > 85a$, the control circuit 102 produces no signal.

The operation of the peak detecting circuit of FIG. 9 will be described with reference to FIG. 10.

The peak detecting circuit is set so that before the objective lens 6 is driven, that is, when the objective lens 6 is at the starting point ls, the counter 91 and the latches 92, 93, 98, 99 are first cleared and the selector 94 selects the latch 92.

Figure 10:
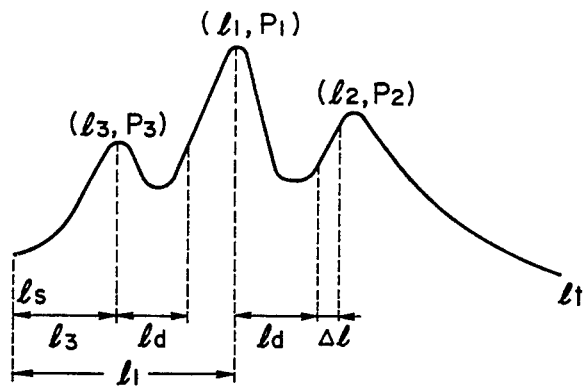
FIG. 10 shows the relation between the high frequency component and the objective lens position to illustrate the operation of the circuit of FIG. 9.

It is to be understood that during the time that the objective lens 6 is moved from its starting point ls to its terminal point lt by the stepping motor being rotated by driving pulse, the waveform signal as shown in FIG. 10 is obtained as the output of the high frequency component extracting circuit 8.

When the objective lens 6 starts to move from the start point ls upon start of the stepping motor, $85a > 98a$ because the latch 98 is cleared in its initial condition. The selector 94 selects the latch 92 and the output 96a of the adder circuit 96 is the sum of the output of the counter 91a and the output ld of the constant setting circuit 95 and so, $96a > 91a$. Accordingly, the control circuit 102 assumes the first mode and produces the first latch signal LS1 each time the A/D conversion termination signal from the high frequency component circuit 8 is supplied at its input terminal 102T. Thereby, the contents of the latches 92 and 98 are successively renewed to the values of the then outputs 91a and 85a. Thus, when the objective lens 6 reaches the third peak position l$_3$ and the third peak value P$_3$ is stored in the latch 98, $98a = 85a$ and so, production of the first latch signal LS1 is stopped. Thus, when the objective lens 6 is moved to a position l$_3$+ld without the values of the latches 92 and 98 being renewed thereafter, $91a > 96a$ and at this time, as is apparent from FIG. 10, $98a > 85a > 98a$.

This is because the high frequency component output 85a of A/D converter 85 is smaller than the third peak value P$_3$ at the lens position (l$_3$+ld) and the latch 97 is kept cleared. Accordingly, the control circuit 102 assumes the third mode and produces the second latch signal LS2, and then causes the selector 94 to select the latch 93. Thus, the third peak (l$_3$, P$_3$) is stored in the latches 92 and 98. Also, by the production of the second latch signal LS2, the latch 99 introduces the then high frequency component output 85a, and the latch 93 introduces the value l$_3$+ld of the then output 91a of the counter 91. By the introduction of this position signal l$_3$+ld, the output 96a of the adder circuit 96 becomes l$_3$+2ld. Since $96a > 91a$ and $85a > 99a$ till the maximum peak position l$_1$, the control circuit 102 assumes the second mode and produces the second latch signal LS2 each time the A/D conversion termination signal from the A/D converter 85 is supplied to input terminal 102T, and the latch circuits 93 and 99 renew their contents to the values of the then outputs 91a and 85a. When the objective lens has passed the maximum peak position $l_1$, $99a > 85a$ and so, production of LS2 is stopped and the maximum peak value $P_1$ and the maximum peak position $l_1$ are stored in the latches 99 and 93, respectively, and this value is not renewed thereafter.

When a position $l_1 + ld$ is reached, $91a \geq 96a$ but, at this time, $99a > 85a$ and $98a > 85a$ and therefore, the control circuit 102 assumes the fifth mode and produces no signal, and when the objective lens is moved by $\Delta l$ thereafter and the output 85a becomes greater than the third peak value $P_3$, that is, when $85a > 98a$, the control circuit 102 assumes the fourth mode and produces the first latch signal LS1, and then causes the selector 94 to select the latch 92. By the production of the first latch signal LS1, the latches 92 and 98 store the then outputs 91a and 85a, respectively. Then, since $96a > 91a$ and $85a > 98a$ till the second peak position $l_2$ and therefore, the control circuit 102 assumes the first mode and produces the first latch signal LS1 and continues to renew the contents of the latches 92 and 98. When the second peak position $l_2$ is passed, $96a > 91a$ but $98a > 85a$ and so, the production of the first latch signal LS1 is stopped and the second peak $l_2$, $P_2$ is stored in the latches 92 and 98. Thus, when the second peak value $P_2$ is greater than the third peak value $P_3$, the latches 92 and 98 discard the third peak $l_3$, $P_3$ so far stored therein and store the second peak $l_2$, $P_2$.

In the foregoing case, $P_2 > P_3$ but, of course, when $P_3 > P_2$, even if the objective lens 6 goes to any point beyond $l_1 + ld$, $99a > 85a$ and $98a > 85a$ and therefore the control circuit 102 always assumes the fifth mode and after all, in this case, the third peak $l_3$ $P_3$ is finally stored in the latches 92 and 98.

In this manner, the peak detecting circuit 9 causes the four latch circuits to finally store the maximum peak position $l_1$, its value $P_1$, the value $P_2$ of the next highest second peak spaced apart from the maximum peak position by ld or more, and its position $l_2$.

The outputs of these four latch circuit 92, 93, 98 and 99 are supplied to the processing circuit 10.

In FIG. 10, the then output value of the high frequency component extracting circuit 8 at the position $(l_3 + ld)$ has been described as being smaller than the third peak value $P_3$, but even when the former is greater than the latter, the above-described operation remains unchanged.

Figure 11:
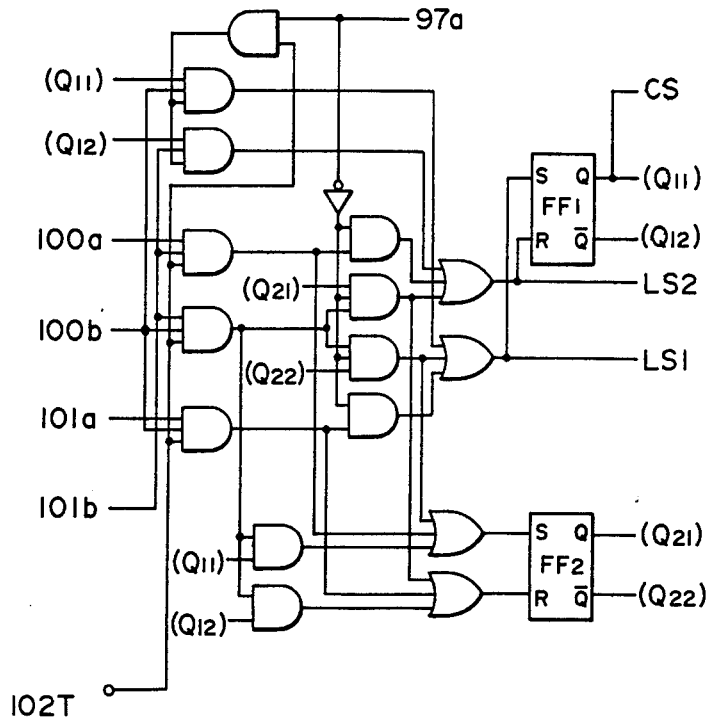
FIG. 11 is a circuit diagram showing the details of the control circuit of FIG. 9.

FIG. 11 shows a specific construction of the control circuit 102 which carries out the above-described first to fifth modes. The characters $Q_{11}$, $Q_{12}$, $Q_{21}$, $Q_{22}$ given to the inputs of logic elements and the characters $Q_{11}$, $Q_{12}$, $Q_{21}$, $Q_{22}$ given to the outputs of the logic elements mean that the inputs and outputs given identical characters are connected to each other.

The above-described embodiment is one in which all is constructed in a hard fashion, whereas whether or not a predetermined peak such as the second peak or the third peak lies within a predetermined distance range from the position of the maximum peak can also be discriminated in a soft fashion by using a computer. The detailed explanation is in the following. In FIG. 4, a computer may be provided instead of the peak detecting circuit 9 and the processing circuit 10, and this computer contains therein a program for driving the driving device 5 and a program for receiving as input the output data of the A/D converter 85 (FIG. 8) of the high frequency component extracting circuit 8 and effecting the focus detection. By the instructions from the computer, the stepping motor of the driving device 5 moves the stage 2 or the objective lens 6 from its start point to its terminal point. The computer stores the output data of the A/D converter 85 in succession, and selects and stores the maximum peak value $P_1$ of the stored data and the then step number of the stepping motor, namely, the relative distance $l_1$ between the stage 2 and the objective lens 6. Then, within a relative distance range l in one direction from $l_1$ which satisfies $l_1 - S - \alpha < l < l_1 - S + \alpha$ (S and $\alpha$ are constant values), the peak value $P_2$ of the data is selected and stored. Likewise, the peak value $P_3$ within a relative distance range l in the opposite direction from $l_1$ which satisfies $l_1 + S - \alpha < l < l_1 + \alpha + \alpha$ is selected and stored. Whether $P_1$ and $P_2$ satisfy $$P_1 > Pth \text{ and } P_2 > Pth \text{ and } (P_1 - P_2)/P_1 > \Delta P \qquad \ldots \text{⑤}$$

or whether $P_1$ and $P_3$ satisfy $$P_1 > Pth \text{ and } P_3 > Pth \text{ and } (P_1 - P_3)/P_1 > \Delta P \qquad \ldots \text{⑥}$$

is discriminated. When at least one of these two conditions is satisfied, the computer can set the stage 2 and the objective lens 6 in a positional relation deviated from $l_1$ by $l_c$, thus accomplishing the focusing.

Figure 12:
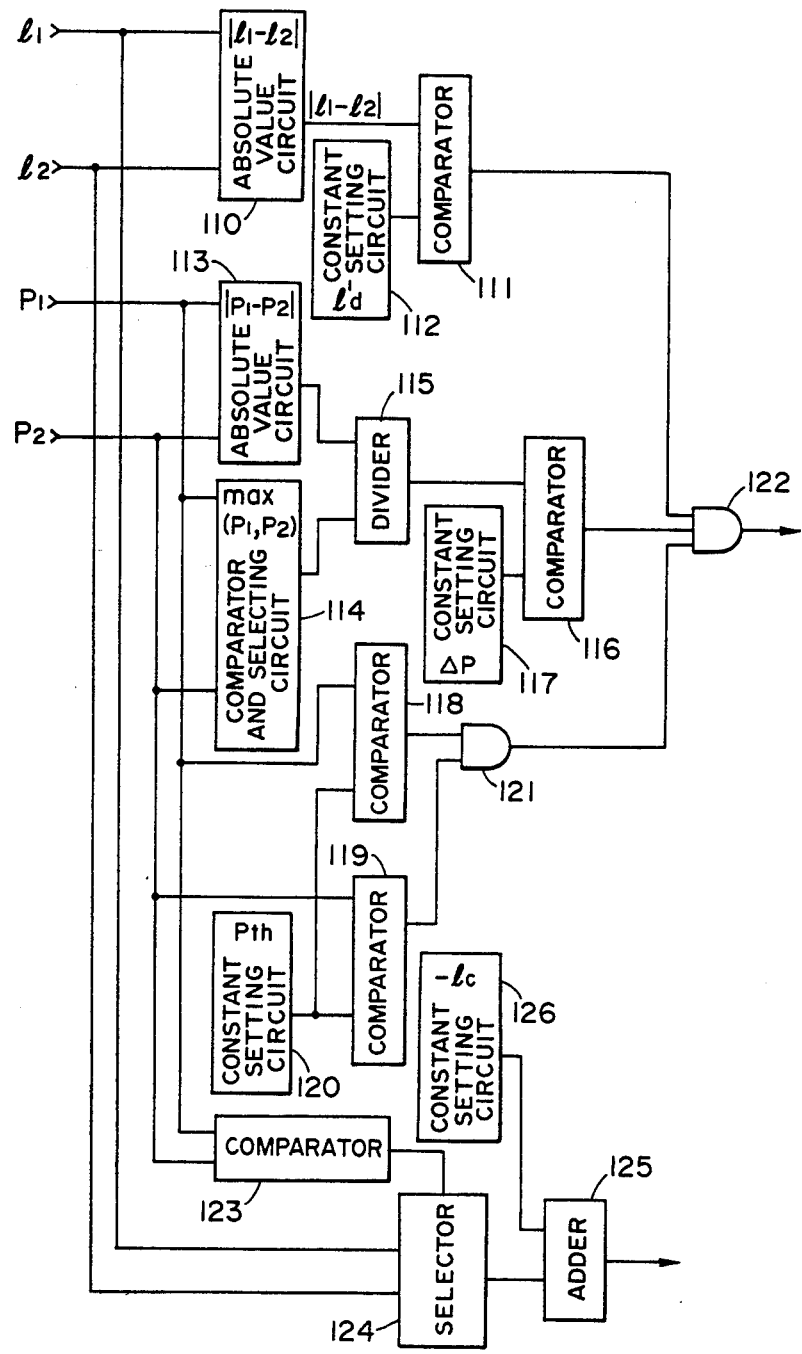
FIG. 12 is a block diagram showing the specific construction of the processing circuit of FIG. 4.

A specific example of the processing circuit 10 will now be described with reference to FIG. 12. Since the outputs $P_1$, $P_2$, $l_1$, $l_2$ from the peak detecting circuit 9 have already satisfied condition ①, the processing circuit 10 judges whether or not each of these outputs satisfies the remaining conditions ② to ④. In FIG. 12, an absolute value circuit 110 calculates the absolute value of the difference between the signals $l_1$ and $l_2$ from the peak detecting circuit 9. A comparator circuit 111 compares the output I'd of a constant setting circuit 112 with the output $|l_1 - l_2|$ of the absolute value circuit 110 and, when the former is greater than the latter, produces logic "1". Condition ② is thus judged. An absolute value circuit 113 calculates the absolute value $|P_1 - P_2|$ of the difference between the signals $P_1$ and $P_2$ from the peak detecting circuit 9. A comparator and selecting circuit 114 compares the signals $P_1$ and $P_2$ and selects an puts out the greater one of them. A division circuit 115 divides the output $|P_1 - P_2|$ of the absolute value circuit 113 by the output max $(P_1, P_2)$ of the comparator and selecting circuit 114. A comparator circuit 116 compares the output $|P_1 - P_2|/\max (P_1, P_2)$ of the division circuit 115 with the output $\Delta P$ of a constant setting circuit 117 and, when the former is greater than the latter, produces logic "1". Condition ③ is thus judged. Comparator circuits 118 and 119 compares the signals $P_1$, $P_2$ with the output Pth of a constant setting circuit 120, respectively and, when the former is greater than the latter, produces logic "1". An AND circuit 121 generates logic "1" when condition ④ is satisfied. An AND circuit 122 produces logic "1" when all of conditions ②-④ are satisfied. A comparator circuit 123 produces logic "1" when the signal $P_1$ is smaller than the signal $P_2$. A selecting circuit 124 selectively produces signal $l_2$ when the output of the comparator circuit 123 is logic "1", and selectively generates signal $l_1$ when the output of the comparator circuit 123 is logic "0". An adder circuit 125 calculates the sum of the output $-l_c$ of a constant setting circuit 126 and the output of the selecting circuit 124, and supplies it to the driving device 5. When the output of the AND circuit 122 is logic "1", the driving device 5 moves the objective lens 6 in accordance with the output of the adder circuit 125.

Figure 13A:
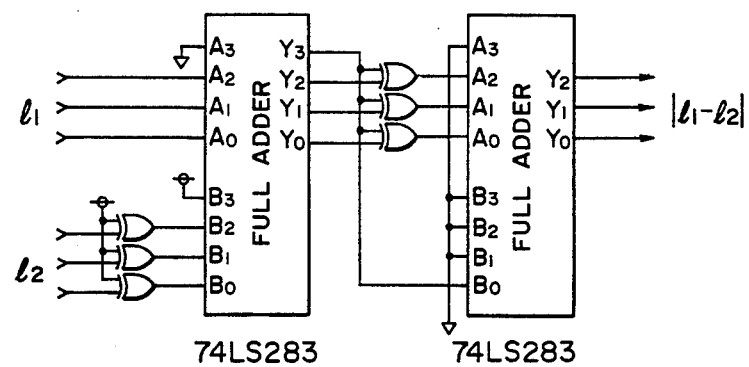
FIGS. 13A and 13B are circuit diagrams showing specific examples of the absolute value circuit and the comparator and selecting circuit of FIG. 12.
Figure 13B:
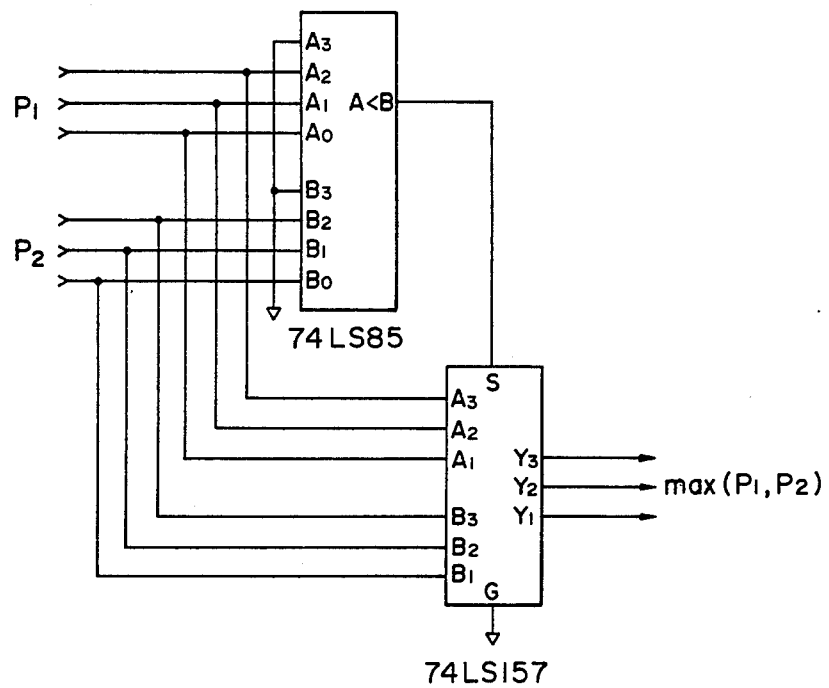

FIGS. 13A and 13B show specific examples of the absolute value circuit 110 and the comparator and selecting circuit 114, respectively.

When HLA specimen 3 has been poured into the well 1W, the lymphocytes 3a which are the object to be observed are sometimes not uniformly distributed but maldistributed on the buttom of the well 1W. Thus, where only few lymphocytes 3a happen to exist in the area to be focus-detected by the one-dimensional image pick-up element array, the high frequency component is little and after all, the peak of the output of the high frequency component extracting circuit 8 does not satisfy the above-mentioned condition ④ and automatic focus adjustment becomes impossible. Accordingly, it is desirable to detect an area in the well 1W in which many objects 3a exist before the above-mentioned focus detecting operation is effected and to focus-detect with respect to that area. For this reason, the automatic focusing device of the present invention detects an area in which the objects 3a aggregate densely, and has to such area a device for driving the one-dimensional image pick-up element array.

This device will hereinafter be described.

Figure 14:
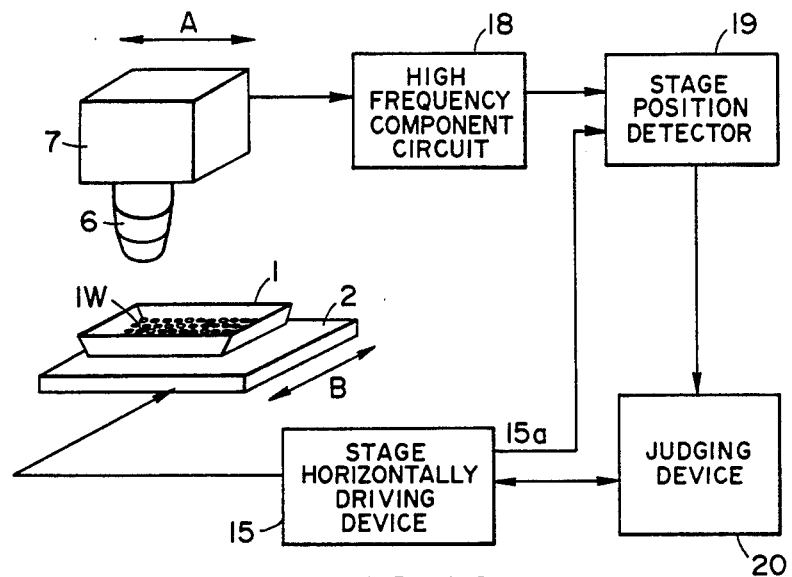
FIG. 14 is a block diagram showing the high density area detecting device of the automatic focusing device of the present invention.
Figure 15:
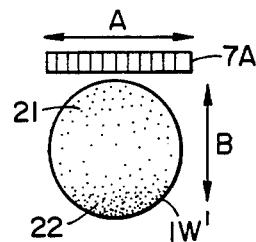
FIG. 15 is a view similar to FIG. 7.

In FIG. 14, a stage horizontally driving device 15 includes a stepping motor and horizontally moves the stage 2 intermittently in the direction of arrow B. This direction of arrow B is a direction perpendicular to the arrangement direction A of the one-dimensional image pick-up element array 7A of the camera 7, as shown in FIG. 15. During the time that the driving device 15 drives the stage 2 by the stepping motor so that the entire area of a well 1W is scanned by the array 7A, pulses 150 synchronized with the driving pulses supplied to the stepping motor are produced as one representing the position of the stage. A high frequency component extracting circuit 18 receiving the output of the camera 7 is entirely identical in construction to the high frequency component extracting circuit 8 of FIG. 4. A stage position detecting circuit 19 is entirely identical in construction to the peak detecting circuit 9, and it detects, from the output of the extracting circuit 18, the maximum peak thereof and the second peak next thereto and also detects, from the aforementioned pulse output 15a of the driving device 15, the stage position which provides the maximum peak and the second peak.

A discriminating device 20 comprises a small electronic computer and discriminates from the output of the detecting circuit 19 whether or not in the well there is an area in which lymphocytes aggregate densely and, when such area exists, moves the stage 2 in the direction of arrow B by the driving device 15 and renders the area of dense aggregation coincident with the array 7A in order to use the area of dense aggregation for the focus detection.

The operation of the present device will now be described.

First, the objective lens 6 is roughly focused to the lymphocytes in the well 1W positioned at one corner of the microtest plate 1. Then, the array 7A and the well 1W are brought into the positional relation as shown in FIG. 15. The array 7A is operated from this state while, at the same time, driving pulse is supplied to the stepping motor of the stage driving device 15. At this time, the array 7A is set so that the sampling of the array is effected, for example, during each stoppage of the stage 2.

Figure 16:
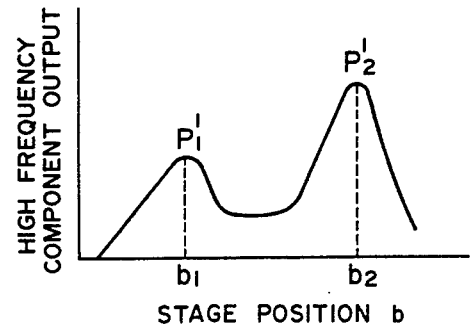
FIG. 16 is a graph showing the relation between the area of dense aggregation of the object and the high frequency component.

The stage 2 is intermittently moved in the direction of arrow B by the driving device 15 and the entire area of the well 1W is scanned. Now, assuming that in the well 1W, there exist a first area of dense aggregation 21 in which lymphocytes aggregate densely and a second area of dense aggregation 22 in which lymphocytes aggregate more densely, as schematically shown in FIG. 15, the relation between the stage position b and the high frequency component output of the high frequency component extracting circuit 18 will be such as shown in FIG. 16. Described in detail, in the area in which lymphocytes aggregate densely, the image thereof contains much of the high frequency component and therefore, the second peak $P'_1$ appears at a stage position $b_1$ corresponding to the first area of dense aggregation 21 and the maximum peak $P'_2$ appears at a stage position $b_2$ corresponding to the second area of dense aggregation 22. The stage position detecting circuit 19 detects the second peak value $P'_1$ from the high frequency component output of the high frequency component extracting circuit 18 and detects the stage position $b_1$ from the counted value of the pulse 15a from the stage driving device 15. Likewise, it detects the maximum peak $P'_2$ and $b_2$. The discriminating device 20 discriminates, from the outputs $(p'_1, b_1) (P'_2, b_2)$ of the detecting circuit 19, whether or not the peak values $P'_1$ and $P'_2$ thereof are greater than an experimentally determined value. If the former are smaller than the latter, there is produced a signal which judges that the lymphocytes are very few in this well 1W and this specimen is inappropriate for th examination and the observation of this well 1W should be stopped and the next well should be observed. If the former are greater than the latter, the stage 2 is moved to the position $b_2$ providing the maximum peak $P'_2$ and the objective lens 6 or the stage 2 is vertically moved by the aforedescribed device of FIG. 4 with respect to the area 22 of densest aggregation to effect automatic focus adjustment. When the focus adjustment is impossible during this automatic focus adjustment for some reason or other, the discriminating device 20 causes the stage 2 to be moved from the densest aggregation position $b_2$ to the second dense aggregation position $b_1$ and effect automatic focus adjustment thereat.

When automatic focus adjustment is completed with respect to this well, the entire area of the well 1W is again scanned by the array 7A and the image signal thereof is processed by an image processing device, not shown, whereby examination of this specimen can be automatically accomplished. When the examination of the lymphocytes in this well 1W is thus completed, the stage 2 is horizontally moved to a position for observing the next well. Since the microtest plate 1 is made of plastics, the in-focus position is deviated for each well due to the warping of the plate itself or irregularity of the thickness of the well bottom. This amount of deviation exceeds the depth of focus of the objective lens 6 and therefore, automatic focus adjustment must be newly effected with regard to the next well, but this amount of deviation is slight and when the stage is horizontally moved and the next well is brought to the observation position, a high frequency component is considerably contained in the then image. Accordingly, once automatic focus adjustment has been effected with respect to a well, the aforementioned manually rough focus adjustment need not at all be effected with respect to the subsequent wells but the operation of detecting the areas of dense aggregation of lymphocytes can be immediately effected.

The detection of the areas of dense aggregation can thus be accomplished by the use of the focus detecting image pick-up element array of FIG. 4, and therefore, the construction becomes simple.

After several (two in the above example) areas of dense aggregation of the object have been thus detected, the operation of detecting the in-focus position is effected at several points with respect to each area of dense aggregation. In this operation, the constants ld, l'd, Pth and $\Delta P$ determining the above-described four conditions ①-④ must be considerably strictly determined to enhance the reliability of the focus detection, but if they are strictly determined, the areas for which the in-focus position cannot be obtained will be increased and there will occur a case where the in-focus position cannot be detected even if the focus detecting operation is effected at several points with respect to a well.

To avoid such situation as far as possible, description will hereinafter be made of a method whereby said conditions are more or less loosened and an evaluation function $\sqrt{(P_1-P_2)/P_1}$ representing whether the possibility of the data $(P_1, l_1)$ $(P_2, l_2)$ of the maximum peak and the next peak being attributable to the in-focus position is strong or weak is prepared so that the in-focus position is determined on the basis of such evaluation function.

The in-focus position detecting operation described in connection with FIG. 4 is effected at several points with regard to each of the areas 21 and 22 of dense aggregation of the object shown in FIG. 15, whereby the maximum peak $(P_1, l_1)$ and the next peak $(P_2, l_2)$ are detected. Now, assume that the value and position of the maximum peak obtained by the ith in-focus position detecting operation are $P_{i1}$ and $l_{i1}$, respectively, and that the value and position of the next peak are $P_{i2}$ and $l_{i2}$, respectively. Also, $P_{i1}$ when $P_{i1}$, $l_{i1}$ and $l_{i2}$ satisfy $P_{i1} > Pth$ and $ld < |l_{i1} - l_{i2}| < l'd$ is called the tentative in-focus position candidate.

(I) FIRST IN-FOCUS POSITION DETECTING OPERATION

When the maximum peak $(P_{11}, l_{11})$ and the second peak $(P_{12}, l_{12})$ are obtained by the first in-focus position detecting operation, the following judgment is effected.

(a) If $P_{11} \leq Pth$ and $P_{12} \leq Pth$, one judges that there is little or no object in this focus detecting area, and discards the then data and immediately shifts to the next focus detecting area to enter the second in-focus position detecting operation.

(b) If $|l_{11}-l_{12}| \leq ld$ or $|l_{11}-l_{12}| \geq l'd$, one judges that the detected peak is attributable to the dust suspended in the specimen or the flaw of the back side of the tray, and again at this, immediately enters the aforementioned second in-focus position detecting operation.

(c) If $P_{11} > Pth$ is satisfied and $ld|l_{11}-l_{12}| < l'd$ is satisfied, the maximum peak position $l_{11}$ becomes the tentative in-focus position candidate. Particularly, in the case of the first detecting operation, this tentative in-focus position candidate $l_{11}$ is intactly stored as a formal in-focus position candidate $L_1$ while, at the same time, a counter $C_1$ corresponding to this formal in-focus position candidate $L_1$ is prepared and 1 is entered thereinto.

(b) Then, the evaluation function $\sqrt{(P_1-P_2)/P_1}$ is calculated and its result (hereinafter referred to as the evaluated value) R is stored as the evaluated value $R_1$ corresponding to the formal candidate $L_1$. It is considered that as this evaluated value $R_1$ is greater, the possibility of the detected peak being a peak attributable to the in-focus is greater.

(e) Whether or not this evaluated value $R_1$ is greater than the predetermined value Rth is detected and, when it is greater, it is regarded as the standard FZ of the in-focus position and when it is smaller, the second detecting operation is entered.

(f) When the standard FZ of the in-focus position has been obtained, a predetermined value $-lc$ is added thereto and the sum is regarded as the in-focus position.

Generally, the value of Rth is determined so as to be always greater than the evaluated value R of one in-focus position detecting operation.

SECOND IN-FOCUS POSITION DETECTING OPERATION

As described above, Rth is selected so that the standard FZ of the in-focus position is not obtained in the first operation and therefore, the stage 2 is horizontally moved and the second in-focus position detecting operation is effected in a focus detecting area different from that in the first in-focus position detecting operation.

(g) If the maximum peak position $l_{21}$ obtained by the second operation is not the tentative in-focus position candidate, the third operation is directly entered at another focus detecting area.

(h) If the maximum peak position $l_{21}$ is the tentative in-focus position candidate, whether or not this value $l_{21}$ is approximate to the first formal in-focus position candidate $L_1$ within a certain range $\Delta L$ is examined. That is, whether or not the tentative candidate $l_{21}$ satisfies $$|L_1 - l_{21}| < \Delta L \qquad \text{⑤}$$

is examined. The constant $\Delta L$ is determined by the depth of focus of the optical system of the microscope.

(i) When formula ⑤ is satisfied, the tentative candidate $l_{21}$ is regarded as identical to the formal candidate $L_1$ and 1 is added to the counter $C_1$ corresponding to the formal candidate $L_1$ while, at the same time, the mean value $(L_1 + l_{21})/2$ of that formal candidate $L_1$ and the tentative candidate $l_{21}$ is substituted as a new formal candidate $L_1$ for the old formal candidate $L_1$ and stored. Thus, the contents of the counter $C_1$ becomes 2, which represents the number of identical in-focus position candidates.

(j) When the tentative candidate $l_{21}$ does not satisfy formula ⑤, this is regarded as the formal candidate $L_2$ and a counter $C_2$ corresponding to the formal candidate $L_2$ is prepared and is caused to count 1.

(k) The evaluation function $\sqrt{(P_{21}-P_{22})/P_{21}}$ is sought after. When the tentative candidate $l_{21}$ satisfies formula ⑤, that is, when it is regarded as identical to the formal candidate $L_1$, this evaluated value R is added to the evaluated value $R_1$ of the previous formal candidate $L_1$ and the sum is stored as the evaluated value $R_1$ of the new formal candidate $L_1$.

(l) When the tentative candidate $l_{21}$ does not satisfy formula ⑤ and has become a formal candidate $L_2$, the evaluated value R obtained in the above item (k) is stored as the evaluated value $R_2$ of the formal candidate $L_2$.

(m) The evaluated value $R_2$ of the new formal candidate $L_2$ or the evaluated value $R_1$ of the new formal candidate $L_1$ is compared with the predetermined value Rth and when the former is greater than the latter, it is regarded as the standard FZ of the in-focus position and, when the former is smaller than the latter, the third detecting operation is entered.

(n) When the standard FZ of the in-focus position has been obtained, the objective lens is moved on the basis thereof.

The above argolism will be generalized and described with respect to the nth in-focus position detecting operation.

(o) If the maximum peak value $Pn_1$ and the second peak value $Pn_2$ obtained in the nth detecting operation are in the relation that $pn_1 < Pth$ and $Pn_2 < Pth$, the $(n+1)$th detecting operation is entered.

(p) If the maximum peak position $ln_1$ and the second peak position $ln_2$ are $|ln_1 - ln_2| < ld$ or $|ln_1 - ln_2| > l'd$, the $(n+1)$th detecting operation is entered.

(q) If the maximum peak position $ln_1$ is a tentative in-focus position candidate, when $Li(i=1 \ldots m)$ satisfying $|Li - ln_1| > \Delta L$ exists in the formal in-focus position candidates $L_1, L_2, \ldots, Lm$ obtained up to the $(n-1)$th detecting operation, the tentative candidate $ln_1$ is regarded as identical to the formal candidate Li and 1 is added to a counter Ci corresponding to that formal candidate Li. When Li satisfying the above-mentioned condition does not exist, the tentative candidate $ln_1$ is regarded as a formal candidate $Lm+1$ and a counter $Cm+1$ is prepared and 1 is added thereto.

(r) When Li exists, $\{Lix(Ci-1)+ln_1\}/Ci$ is stored as the value of a new formal candidate Li. Here, $(Ci-1)$ is the contents of the counter Ci before 1 is added in said item (q).

When a counter $Cm+1$ has been prepared, $ln_1$ is stored as a formal candidate $Lm+1$.

(s) The evaluation function $\sqrt{(Pn_1 - Pn_2)/Pn_1}$ is sought after.

(t) When 1 has been added to the counter Ci, the value R obtain in the item (s) is added to the evaluated value Ri of the formal candidate Li and the sum is stored as the evaluated value Ri of a new formal candidate Li. When the counter $Cm+1$ has been prepared, the value R obtain in the item (s) is intactly stored as the evaluated value $Rm+1$ of the formal candidate $Lm+1$.

(u) The evaluated value Ri of the new formal candidate Li or the evaluated value $Rm+1$ of the formal candidate $Lm+1$ is compared with Rth and, if the former is greater than the latter, Li or $Lm+1$ is regarded as the standard FZ of the in-focus position and, if the former is smaller than the latter, the $(n+1)$th detecting operation is entered.

(v) When the standard FZ of the in-focus position has been obtained, FZ plus the predetermined value $-lc$ is regarded as the in-focus position.

when the in-focus position could not be determined even by carrying out this in-focus position detecting operation over a predetermined number of times, that well is regarded as one for which focus detection is impossible, and the observation of that well is stopped and the operator shifts to the focus detection of the next well. The argolism for the in-focus position detecting operation is carried out in an electronic computer.

Thus, if, by using the evaluation function representing the magnitude of the possibility of the detected peak being attributable to the in-focus, substantially the same value has been obtained as the in-focus position candidate several times in a plurality of times of in-focus position detecting operation, those evaluated values are added together and when the sum has become a predetermined value, the in-focus position is determined on the basis of that in-focus position candidate. Accordingly, even if a relatively great evaluated value happens to occur at a position other than the in-focus position for some reason or other, the probability of such a thing taking place over a plurality of times is generally very rare. On the other hand, a plurality of in-focus position candidates attributable to a proper in-focus position are naturally obtained by a plurality of times of operation and therefore, a proper in-focus position can be determined by setting the above-mentioned predetermined value Rth to a value greater than said relatively great evaluated value attributable to the false in-focus.

In this in-focus position determining method using the evaluation function, the maximum peak and the second peak are unconditionally detected from the output of the high frequency component extracting circuit and whether or not these two peaks satisfy $|ln_1 - ln_2| > ld$ is judged in the electronic computer, whereas if the peak detecting circuit 9 of FIG. 4 is used, the condition $|ln_1 - ln_2| < ld$ in said argolism will become unnecessary because the output $(P_1, l_1)$, $(P_2, l_2)$ of this peak detecting circuit 9 satisfies $|l_1 - l_2| > ld$.

The present invention is not restricted to the focus detection of a phase contrast microscope for observing therethrough HLA examining sample, but is also applicable to other similar samples.

We claim:

1. An automatic focusing device of a microscope having an objective lens and a stage on which a specimen is placed, said device comprising:
    (a) distance varying means for varying the relative distance between said objective lens and said stage;
    (b) distance detecting means for producing a distance output corresponding to said distance;
    (c) photoelectric detector means for photoelectrically detecting a high frequency component of the space frequency component of the image of the specimen by said objective lens;
    (d) judging means for judging whether or not a predetermined peak smaller than a maximum peak exists in the output of said photoelectric detector means within a predetermined distance range from a first distance output of said distance detecting means, when the output of said photoelectric detector means assumes said maximum peak, and for producing an in-focus output when said predetermined peak exists; and
    (e) means for determining said relative distance on the basis of said in-focus output.

2. An automatic focusing device according to claim 1, wherein said microscope is a phase-contrast microscope and said in-focus output is a distance output comprising said first distance output plus a predetermined value.

3. An automatic focusing device according to claim 1, wherein said judging means includes;
    peak detecting means for detecting said maximum peak and the next second peak from the output of said photoelectric detector means and detecting from said distance output said first distance output providing said maximum peak and a second distance output providing said second peak; and
    difference detecting means for detecting that the difference between the first distance output and the second distance output of said peak detecting means exists within a predetermined range.

4. An automatic focusing device according to claim 3, wherein said judging means further includes means for preventing the production of said in-focus output when the value of said maximum peak is below a predetermined value.

5. An automatic focusing device according to claim 1, further comprising high density area detecting means for detecting the high density area of the object to be focused in said specimen, and wherein said photoelectric detector means photoelectrically detects the image of the high density area detected by said high density area detecting means.

6. An automatic focusing device according to claim 5, wherein said photoelectric detector means includes an image pick-up device and extracting means for extracting the high frequency component of the output of said image pick-up device, and said high density area detecting means includes scanning means for causing said image pick-up device to scan almost the entire area of said specimen and means for detecting as said high density area the peak of the output of said extracting means attributable to said scanning.

* * * * *